United States Patent
Hong et al.

(10) Patent No.: US 10,290,054 B2
(45) Date of Patent: *May 14, 2019

(54) SYSTEMS AND METHODS FOR PERFORMING SCORING OPTIMIZATION

(71) Applicant: JPMorgan Chase Bank, N.A., New York, NY (US)

(72) Inventors: Xiao Hong, Wilmington, DE (US); Xiaolan Song, Bear, DE (US); Xin Dong, Newark, DE (US); Huchen Fei, Newark, DE (US); Lihua Wang, Newark, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 14/311,821

(22) Filed: Jun. 23, 2014

(65) Prior Publication Data

US 2014/0304146 A1    Oct. 9, 2014

Related U.S. Application Data

(63) Continuation of application No. 13/585,218, filed on Aug. 14, 2012, now Pat. No. 8,762,260, which is a
(Continued)

(51) Int. Cl.
*G06Q 40/00* (2012.01)
*G06Q 40/02* (2012.01)

(52) U.S. Cl.
CPC ........... *G06Q 40/025* (2013.01); *G06Q 40/00* (2013.01); *G06Q 40/02* (2013.01)

(58) Field of Classification Search
CPC ............................. G06Q 40/025; G06Q 40/00
(Continued)

(56) References Cited

U.S. PATENT DOCUMENTS 3,316,395 A    4/1967 Lavin
3,609,895 A    10/1971 Wyckoff et al.
(Continued)

FOREIGN PATENT DOCUMENTS

WO    WO 96/32576    7/1996
WO    WO 02/03226    1/2002

OTHER PUBLICATIONS

Fortz Bernard, Thorup Mikkel, "Internet Traffic Engineering by Optimizing OSPF Weights", IEEE Infocom 2000 (Year: 2000).*
(Continued)

*Primary Examiner* — Eric T Wong
*Assistant Examiner* — Kevin T Poe
(74) *Attorney, Agent, or Firm* — Hunton Andrews Kurth LLP

(57) ABSTRACT

The invention provides systems and methods relating to generating a unified determination based on subdetermination, and in particular, generating a unified score based on respective scores. For example, the invention provides a method for generating a unified determination based on subdeterminations, the method including generating a first subdetermination based on first criteria; generating a second subdetermination based on second criteria; and generating a unified determination based on the first subdetermination and the second subdetermination. The generation of the unified determination includes (a) assigning, using iterative processing, an assigned weighting respectively to the first determination and second determination; (b) determining if the assigned weighting satisfies at least one constraint; (c) comparing the assigned weighting to an optimized weighting, which was previously determined, to determine if the assigned weighting is improved over the optimized weighting; and (d) if the assigned weighting is improved, then
(Continued)

assigning the assigned weighting to be the optimized weighting.

16 Claims, 6 Drawing Sheets

Related U.S. Application Data continuation of application No. 13/085,193, filed on Apr. 12, 2011, now Pat. No. 8,255,319, which is a continuation of application No. 11/211,728, filed on Aug. 26, 2005, now Pat. No. 7,925,578.

(58) Field of Classification Search
USPC .......................................................... 705/38
See application file for complete search history.

(56) References Cited

U.S. PATENT DOCUMENTS

| | | |
|---|---|---|
| 3,719,927 A | 3/1973 | Michels et al. |
| 4,223,403 A | 9/1980 | Konheim et al. |
| 4,254,474 A | 3/1981 | Cooper et al. |
| 4,319,336 A | 3/1982 | Anderson et al. |
| 4,594,663 A | 6/1986 | Hirayama |
| 4,598,367 A | 7/1986 | DeFrancesco et al. |
| 4,605,820 A | 8/1986 | Campbell, Jr. |
| 4,641,239 A | 2/1987 | Takesako |
| 4,642,768 A | 2/1987 | Roberts |
| 4,661,658 A | 4/1987 | Matyas |
| 4,713,760 A | 12/1987 | Yamada et al. |
| 4,734,564 A | 3/1988 | Boston et al. |
| 4,736,294 A | 4/1988 | Le Grand |
| 4,739,478 A | 4/1988 | Roberts et al. |
| 4,752,676 A | 6/1988 | Leonard et al. |
| 4,760,604 A | 7/1988 | Cooper |
| 4,812,628 A | 3/1989 | Boston |
| 4,831,526 A | 5/1989 | Luchs |
| 4,866,634 A | 9/1989 | Reboh |
| 4,877,847 A | 10/1989 | Masu et al. |
| 4,891,503 A | 1/1990 | Jewell |
| 4,897,811 A | 1/1990 | Scofield |
| 4,914,587 A | 4/1990 | Clouse |
| 4,964,043 A | 10/1990 | Galvin |
| 5,023,782 A | 6/1991 | Lutz et al. |
| 5,054,096 A | 10/1991 | Beizer |
| 5,175,682 A | 12/1992 | Higashiyama |
| 5,206,803 A | 4/1993 | Vitagliano |
| 5,220,500 A | 6/1993 | Baird |
| 5,227,874 A | 7/1993 | Von Kohorn |
| 5,231,569 A | 7/1993 | Myatt et al. |
| 5,231,571 A | 7/1993 | D'Agostino |
| 5,233,547 A | 8/1993 | Kapp et al. |
| 5,237,620 A | 8/1993 | Deaton |
| 5,239,462 A | 8/1993 | Jones |
| 5,258,935 A | 11/1993 | Ure |
| 5,262,941 A | 11/1993 | Saladin |
| 5,265,008 A | 11/1993 | Benton et al. |
| 5,270,022 A | 12/1993 | Higgins |
| 5,274,547 A | 12/1993 | Zoffel |
| 5,278,751 A | 1/1994 | Adiano |
| 5,311,594 A | 5/1994 | Penzias |
| 5,317,636 A | 5/1994 | Vizcaino |
| 5,321,841 A | 6/1994 | East |
| 5,424,938 A | 6/1995 | Wagner |
| 5,428,684 A | 6/1995 | Akiyama et al. |
| 5,430,644 A | 7/1995 | Deaton et al. |
| 5,444,844 A | 8/1995 | Inoue |
| 5,448,471 A | 9/1995 | Deaton et al. |
| 5,481,647 A | 1/1996 | Brody |
| 5,500,890 A | 3/1996 | Rogge et al. |
| 5,523,942 A | 6/1996 | Tyler |
| 5,537,315 A | 7/1996 | Mitcham |
| 5,539,825 A | 7/1996 | Akiyama et al. |
| 5,550,734 A | 8/1996 | Tater |
| 5,551,021 A | 8/1996 | Harada |
| 5,606,496 A | 2/1997 | D'Agostino |
| 5,611,052 A | 3/1997 | Dykstra |
| 5,621,812 A | 4/1997 | Deaton et al. |
| 5,638,457 A | 6/1997 | Deaton et al. |
| 5,642,485 A | 6/1997 | Deaton et al. |
| 5,644,493 A | 7/1997 | Motai |
| 5,644,723 A | 7/1997 | Deaton et al. |
| 5,649,114 A | 7/1997 | Deaton et al. |
| 5,649,116 A | 7/1997 | McCoy |
| 5,652,786 A | 7/1997 | Rogers |
| 5,655,085 A | 8/1997 | Ryan |
| 5,659,469 A | 8/1997 | Deaton et al. |
| 5,664,115 A | 9/1997 | Fraser |
| 5,687,322 A | 11/1997 | Deaton et al. |
| 5,689,649 A | 11/1997 | Alunan et al. |
| 5,696,907 A | 12/1997 | Tom |
| 5,699,527 A | 12/1997 | Davidson |
| 5,701,400 A | 12/1997 | Amado |
| 5,704,044 A | 12/1997 | Tarter et al. |
| 5,704,046 A | 12/1997 | Hogan |
| 5,710,889 A | 1/1998 | Clark et al. |
| 5,715,298 A | 2/1998 | Rogers |
| 5,715,402 A | 2/1998 | Popolo |
| 5,717,865 A | 2/1998 | Stratmann |
| 5,732,397 A | 3/1998 | DeTore |
| 5,740,240 A | 4/1998 | Jolissaint |
| 5,742,775 A | 4/1998 | King |
| 5,758,328 A | 5/1998 | Giovannoli |
| 5,765,144 A | 6/1998 | Larche |
| 5,774,882 A | 6/1998 | Keen |
| 5,774,883 A | 6/1998 | Andersen et al. |
| 5,787,403 A | 7/1998 | Randle |
| 5,794,207 A | 8/1998 | Walker |
| 5,797,133 A | 8/1998 | Jones |
| 5,802,251 A | 9/1998 | Cohen |
| 5,802,502 A | 9/1998 | Gell |
| 5,809,478 A | 9/1998 | Greco |
| 5,815,683 A | 9/1998 | Vogler |
| 5,832,447 A | 11/1998 | Rieker |
| 5,832,457 A | 11/1998 | O'Brien |
| 5,838,906 A | 11/1998 | Doyle |
| 5,842,178 A | 11/1998 | Giovannoli |
| 5,842,421 A | 12/1998 | Desilets et al. |
| 5,844,553 A | 12/1998 | Hao |
| 5,845,256 A | 12/1998 | Pescitelli |
| 5,848,427 A | 12/1998 | Hyodo |
| 5,852,811 A | 12/1998 | Atkins |
| 5,862,223 A | 1/1999 | Walker |
| 5,870,456 A | 2/1999 | Rogers |
| 5,870,721 A | 2/1999 | Norris |
| 5,870,723 A | 2/1999 | Pare |
| 5,873,096 A | 2/1999 | Lim |
| 5,875,437 A | 2/1999 | Atkins |
| 5,878,403 A | 3/1999 | Agrawal |
| 5,883,810 A | 3/1999 | Franklin et al. |
| 5,897,621 A | 4/1999 | Boesch et al. |
| 5,899,982 A | 5/1999 | Randle |
| 5,903,881 A | 5/1999 | Schrader |
| 5,910,988 A | 6/1999 | Ballard |
| 5,911,135 A | 6/1999 | Atkins |
| 5,913,202 A | 6/1999 | Motoyama |
| 5,918,217 A | 6/1999 | Maggioncalda |
| 5,920,848 A | 7/1999 | Schutzer |
| 5,926,800 A | 7/1999 | Baronowski et al. |
| 5,930,764 A | 7/1999 | Melchione |
| 5,930,775 A | 7/1999 | McCauley |
| 5,930,776 A | 7/1999 | Dykstra |
| 5,933,812 A | 8/1999 | Meyer et al. |
| 5,940,811 A | 8/1999 | Norris |
| 5,940,812 A | 8/1999 | Tengel et al. |
| 5,949,044 A | 9/1999 | Walker et al. |
| 5,953,710 A | 9/1999 | Fleming |
| 5,963,953 A | 10/1999 | Cram et al. |
| 5,966,699 A | 10/1999 | Zandi |
| 5,970,482 A | 10/1999 | Pham |
| 5,970,483 A | 10/1999 | Evans |
| 5,983,206 A | 11/1999 | Oppenheimer |
| 5,987,434 A | 11/1999 | Libman |

(56) References Cited

U.S. PATENT DOCUMENTS

| | | |
|---|---|---|
| 5,987,436 A | 11/1999 | Halbrook |
| 5,991,750 A | 11/1999 | Watson |
| 5,995,947 A | 11/1999 | Fraser |
| 5,999,908 A | 12/1999 | Abelow |
| 6,006,205 A | 12/1999 | Loeb et al. |
| 6,012,044 A | 1/2000 | Maggioncalda et al. |
| 6,012,049 A | 1/2000 | Kawan |
| 6,014,645 A | 1/2000 | Cunningham |
| 6,014,646 A | 1/2000 | Vallee et al. |
| 6,018,718 A | 1/2000 | Walker et al. |
| 6,029,139 A | 2/2000 | Cunningham et al. |
| 6,029,149 A | 2/2000 | Dykstra |
| 6,029,153 A | 2/2000 | Bauchner et al. |
| 6,032,136 A | 2/2000 | Brake, Jr. et al. |
| 6,032,137 A | 2/2000 | Ballard |
| 6,055,517 A | 4/2000 | Friend et al. |
| 6,076,072 A | 6/2000 | Libman |
| 6,078,905 A | 6/2000 | Pick-LeWinter |
| 6,088,686 A | 7/2000 | Walker et al. |
| 6,105,007 A | 8/2000 | Norris |
| 6,108,642 A | 8/2000 | Findley |
| 6,108,644 A | 8/2000 | Goldschlag et al. |
| 6,112,190 A | 8/2000 | Fletcher et al. |
| 6,128,599 A | 10/2000 | Walker et al. |
| 6,128,603 A | 10/2000 | Dent et al. |
| 6,134,530 A | 10/2000 | Bunting et al. |
| 6,141,666 A | 10/2000 | Tobin |
| 6,144,948 A | 11/2000 | Walker et al. |
| 6,167,383 A | 12/2000 | Henson |
| 6,169,974 B1 | 1/2001 | Baumgartner et al. |
| 6,182,059 B1 | 1/2001 | Angotti et al. |
| 6,185,543 B1 | 2/2001 | Galperin et al. |
| 6,202,053 B1 | 3/2001 | Christiansen et al. |
| 6,208,979 B1 | 3/2001 | Sinclair |
| 6,216,115 B1 | 4/2001 | Barrameda et al. |
| 6,233,566 B1 | 5/2001 | Levine et al. |
| 6,243,689 B1 | 6/2001 | Norton |
| 6,249,775 B1 | 6/2001 | Freeman et al. |
| 6,260,026 B1 | 7/2001 | Tomida et al. |
| 6,267,292 B1 | 7/2001 | Walker et al. |
| 6,272,528 B1 | 8/2001 | Cullen et al. |
| 6,278,996 B1 | 8/2001 | Richardson et al. |
| 6,289,324 B1 | 9/2001 | Kawan |
| 6,292,786 B1 | 9/2001 | Deaton et al. |
| 6,311,169 B2 | 10/2001 | Duhon |
| 6,317,797 B2 | 11/2001 | Clark et al. |
| 6,324,524 B1 | 11/2001 | Lent et al. |
| 6,332,126 B1 | 12/2001 | Peirce et al. |
| 6,334,108 B1 | 12/2001 | Deaton et al. |
| 6,339,766 B1 | 1/2002 | Gephart |
| 6,343,279 B1 | 1/2002 | Bissonette et al. |
| 6,349,290 B1 | 2/2002 | Horowitz et al. |
| 6,360,209 B1 | 3/2002 | Loeb et al. |
| 6,374,230 B1 | 4/2002 | Walker et al. |
| 6,385,594 B1 | 5/2002 | Lebda et al. |
| 6,404,866 B1 | 6/2002 | Hopper et al. |
| 6,405,181 B2 | 6/2002 | Lent et al. |
| 6,411,947 B1 | 6/2002 | Rice et al. |
| 6,422,462 B1 | 7/2002 | Cohen |
| 6,424,947 B1 | 7/2002 | Tsuria et al. |
| 6,424,949 B1 | 7/2002 | Deaton et al. |
| 6,434,534 B1 | 8/2002 | Walker et al. |
| 6,477,509 B1 | 11/2002 | Hammons |
| 6,502,080 B1 | 12/2002 | Eichorst et al. |
| 6,505,176 B2 | 1/2003 | DeFrancesco, Jr. et al. |
| 6,513,019 B2 | 1/2003 | Lewis |
| 6,516,302 B1 | 2/2003 | Deaton et al. |
| 6,529,187 B1 | 3/2003 | Dickelman |
| 6,556,979 B1 | 4/2003 | Liu et al. |
| 6,567,791 B2 | 5/2003 | Lent et al. |
| 6,578,761 B1 | 6/2003 | Spector |
| 6,587,841 B1 | 7/2003 | DeFrancesco et al. |
| 6,601,034 B1 | 7/2003 | Honarvar et al. |
| 6,601,044 B1 | 7/2003 | Wallman |
| 6,609,104 B1 | 8/2003 | Deaton et al. |
| 6,611,811 B1 | 8/2003 | Deaton et al. |
| 6,611,819 B1 | 8/2003 | Oneda |
| 6,636,833 B1 | 10/2003 | Flitcroft et al. |
| 6,647,376 B1 | 11/2003 | Farrar et al. |
| 6,658,393 B1 * | 12/2003 | Basch .................. G06Q 20/341 705/35 |
| 6,662,215 B1 | 12/2003 | Moskowitz et al. |
| 6,684,195 B1 | 1/2004 | Deaton et al. |
| 6,691,094 B1 | 2/2004 | Herschkorn |
| 6,714,919 B1 | 3/2004 | Findley |
| 6,718,313 B1 | 4/2004 | Lent et al. |
| 6,739,506 B1 | 5/2004 | Constantine |
| 6,754,640 B2 | 6/2004 | Bozeman |
| 6,795,809 B2 | 9/2004 | O'Brien et al. |
| 6,795,812 B1 | 9/2004 | Lent et al. |
| 6,804,786 B1 | 10/2004 | Chamley et al. |
| 6,805,287 B2 | 10/2004 | Bishop |
| 6,817,008 B2 | 11/2004 | Ledford et al. |
| 6,817,521 B1 | 11/2004 | Matada |
| 6,819,748 B2 | 11/2004 | Weiss et al. |
| 6,839,680 B1 | 1/2005 | Liu et al. |
| 6,865,547 B1 | 3/2005 | Brake, Jr. et al. |
| 6,874,139 B2 | 3/2005 | Krueger et al. |
| 6,877,656 B1 | 4/2005 | Jaros et al. |
| 6,898,636 B1 | 5/2005 | Adams et al. |
| 6,901,406 B2 | 5/2005 | Nabe et al. |
| 6,910,020 B2 | 6/2005 | Oyama et al. |
| 6,938,156 B2 | 8/2005 | Wheeler et al. |
| RE38,801 E | 9/2005 | Rogers |
| 6,950,940 B2 | 9/2005 | Wheeler et al. |
| 6,963,857 B1 | 11/2005 | Johnson |
| 6,970,830 B1 | 11/2005 | Samra et al. |
| 6,999,938 B1 | 2/2006 | Libman |
| 7,003,476 B1 | 2/2006 | Samra et al. |
| 7,006,979 B1 | 2/2006 | Samra et al. |
| 7,010,495 B1 | 3/2006 | Samra et al. |
| 7,016,843 B2 | 3/2006 | Fitzpatrick et al. |
| 7,044,365 B2 | 5/2006 | Witherspoon |
| 7,072,864 B2 | 7/2006 | Brake, Jr. et al. |
| 7,092,905 B2 | 8/2006 | Behrenbrinker et al. |
| 7,143,063 B2 | 11/2006 | Lent et al. |
| 7,167,553 B2 | 1/2007 | Shaffer et al. |
| 7,212,995 B2 | 5/2007 | Schulkins |
| 7,287,008 B1 | 10/2007 | Mahoney et al. |
| 7,356,516 B2 | 4/2008 | Richey et al. |
| 7,523,385 B2 | 4/2009 | Nguyen et al. |
| 7,587,363 B2 | 9/2009 | Cataline et al. |
| 7,610,229 B1 * | 10/2009 | Kornegay et al. ............... 705/38 |
| 7,640,205 B2 | 12/2009 | Michelassi et al. |
| 7,676,425 B1 | 3/2010 | Noles |
| 7,689,506 B2 | 3/2010 | Fei et al. |
| 7,707,111 B2 | 4/2010 | Brake, Jr. et al. |
| 8,694,420 B1 * | 4/2014 | Oliai ................................. 705/38 |
| 2001/0011255 A1 | 8/2001 | Asay et al. |
| 2001/0029482 A1 | 10/2001 | Tealdi et al. |
| 2001/0029490 A1 | 10/2001 | Inamochi |
| 2001/0034663 A1 | 10/2001 | Teveler et al. |
| 2001/0034718 A1 | 10/2001 | Shaked et al. |
| 2001/0037289 A1 | 11/2001 | Mayr et al. |
| 2001/0037299 A1 | 11/2001 | Nichols et al. |
| 2001/0044764 A1 | 11/2001 | Arnold |
| 2001/0047313 A1 | 11/2001 | Kanai |
| 2001/0047489 A1 | 11/2001 | Ito et al. |
| 2002/0007341 A1 | 1/2002 | Lent et al. |
| 2002/0013728 A1 | 1/2002 | Wilkman |
| 2002/0026365 A1 | 2/2002 | Natanzon |
| 2002/0026410 A1 | 2/2002 | Woloshin et al. |
| 2002/0032645 A1 | 3/2002 | Nozaki et al. |
| 2002/0038363 A1 | 3/2002 | MacLean |
| 2002/0048369 A1 | 4/2002 | Ginter et al. |
| 2002/0049605 A1 | 4/2002 | Hagi |
| 2002/0052833 A1 | 5/2002 | Lent et al. |
| 2002/0052836 A1 | 5/2002 | Galperin et al. |
| 2002/0052842 A1 | 5/2002 | Schuba et al. |
| 2002/0059137 A1 | 5/2002 | Freeman et al. |
| 2002/0062257 A1 | 5/2002 | Minamishin et al. |
| 2002/0062282 A1 | 5/2002 | Kight et al. |
| 2002/0062285 A1 | 5/2002 | Amann et al. |
| 2002/0069158 A1 | 6/2002 | Larkin et al. |

(56) References Cited

U.S. PATENT DOCUMENTS

| | | |
|---|---|---|
| 2002/0069159 A1 | 6/2002 | Talbot et al. |
| 2002/0073019 A1 | 6/2002 | Deaton |
| 2002/0077890 A1 | 6/2002 | LaPointe et al. |
| 2002/0077964 A1 | 6/2002 | Brody et al. |
| 2002/0077966 A1 | 6/2002 | Harycki et al. |
| 2002/0082962 A1 | 6/2002 | Farris et al. |
| 2002/0087468 A1 | 7/2002 | Ganesan et al. |
| 2002/0090985 A1* | 7/2002 | Tochner et al. ............... 463/1 |
| 2002/0091628 A1 | 7/2002 | Kunimatsu |
| 2002/0091635 A1 | 7/2002 | Dilip et al. |
| 2002/0099649 A1 | 7/2002 | Lee et al. |
| 2002/0103749 A1 | 8/2002 | Agudo et al. |
| 2002/0111891 A1 | 8/2002 | Hoffman et al. |
| 2002/0116257 A1 | 8/2002 | Helbig |
| 2002/0116331 A1 | 8/2002 | Cataline et al. |
| 2002/0120571 A1 | 8/2002 | Maung et al. |
| 2002/0120846 A1 | 8/2002 | Stewart et al. |
| 2002/0123946 A1 | 9/2002 | Haworth et al. |
| 2002/0123960 A1 | 9/2002 | Ericksen |
| 2002/0130175 A1 | 9/2002 | Nakajima |
| 2002/0147691 A1 | 10/2002 | Davis et al. |
| 2002/0152116 A1 | 10/2002 | Yan et al. |
| 2002/0156723 A1 | 10/2002 | Lilly et al. |
| 2002/0165808 A1 | 11/2002 | Zamsky et al. |
| 2002/0178112 A1 | 11/2002 | Goeller et al. |
| 2002/0184140 A1 | 12/2002 | Quaile et al. |
| 2002/0188478 A1 | 12/2002 | Breeland et al. |
| 2002/0188556 A1 | 12/2002 | Colica et al. |
| 2002/0188565 A1 | 12/2002 | Nakamura et al. |
| 2002/0194119 A1 | 12/2002 | Wright et al. |
| 2002/0198807 A1 | 12/2002 | Kobayashi et al. |
| 2003/0004802 A1* | 1/2003 | Callegari ............... 705/14 |
| 2003/0004866 A1 | 1/2003 | Huennekens et al. |
| 2003/0005288 A1 | 1/2003 | Moskowitz et al. |
| 2003/0014343 A1 | 1/2003 | Jones |
| 2003/0023557 A1 | 1/2003 | Moore |
| 2003/0028451 A1 | 2/2003 | Ananian |
| 2003/0033252 A1 | 2/2003 | Buttridge et al. |
| 2003/0046222 A1 | 3/2003 | Bard et al. |
| 2003/0046223 A1 | 3/2003 | Crawford et al. |
| 2003/0048888 A1 | 3/2003 | Hopper et al. |
| 2003/0065618 A1 | 4/2003 | VanDeBoe, Jr. |
| 2003/0083967 A1 | 5/2003 | Fleming |
| 2003/0101133 A1 | 5/2003 | DeFrancesco, Jr. et al. |
| 2003/0105688 A1 | 6/2003 | Brown et al. |
| 2003/0120586 A1 | 6/2003 | Litty |
| 2003/0125969 A1 | 7/2003 | Kizer et al. |
| 2003/0126011 A1 | 7/2003 | Bryman et al. |
| 2003/0130904 A1 | 7/2003 | Katz et al. |
| 2003/0135448 A1 | 7/2003 | Aguias et al. |
| 2003/0135449 A1 | 7/2003 | Xu et al. |
| 2003/0135450 A1 | 7/2003 | Aguais et al. |
| 2003/0140000 A1 | 7/2003 | Lee |
| 2003/0149629 A1 | 8/2003 | Claridge et al. |
| 2003/0158782 A1 | 8/2003 | Thomson et al. |
| 2003/0176931 A1 | 9/2003 | Pednault et al. |
| 2003/0195840 A1 | 10/2003 | Xu |
| 2003/0208439 A1 | 11/2003 | Rast |
| 2003/0212630 A1 | 11/2003 | Kahr |
| 2003/0217003 A1 | 11/2003 | Weinflash et al. |
| 2003/0229582 A1 | 12/2003 | Sherman et al. |
| 2003/0229590 A1 | 12/2003 | Byrne et al. |
| 2003/0233255 A1 | 12/2003 | Dirienzo |
| 2003/0236740 A1 | 12/2003 | Lang et al. |
| 2004/0002916 A1 | 1/2004 | Timmerman et al. |
| 2004/0010462 A1 | 1/2004 | Moon et al. |
| 2004/0030637 A1 | 2/2004 | Robison et al. |
| 2004/0030667 A1 | 2/2004 | Xu et al. |
| 2004/0039686 A1 | 2/2004 | Klebanoff |
| 2004/0044606 A1 | 3/2004 | Buttridge et al. |
| 2004/0044615 A1 | 3/2004 | Xue et al. |
| 2004/0064401 A1 | 4/2004 | Palaghita et al. |
| 2004/0078324 A1 | 4/2004 | Lonnberg et al. |
| 2004/0078328 A1 | 4/2004 | Talbert et al. |
| 2004/0078332 A1 | 4/2004 | Ferguson et al. |
| 2004/0093218 A1 | 5/2004 | Bezar |
| 2004/0111359 A1 | 6/2004 | Hudock |
| 2004/0111363 A1 | 6/2004 | Trench et al. |
| 2004/0111371 A1 | 6/2004 | Friedman |
| 2004/0128248 A1 | 7/2004 | Fujihara et al. |
| 2004/0138991 A1 | 7/2004 | Song et al. |
| 2004/0143526 A1 | 7/2004 | Monasterio et al. |
| 2004/0172358 A1 | 9/2004 | Lent et al. |
| 2004/0181441 A1 | 9/2004 | Fung et al. |
| 2004/0193540 A1 | 9/2004 | Brown et al. |
| 2004/0199406 A1 | 10/2004 | Owens et al. |
| 2004/0210531 A1 | 10/2004 | Barron et al. |
| 2004/0236688 A1 | 11/2004 | Bozeman |
| 2004/0243506 A1 | 12/2004 | Das |
| 2004/0249689 A1 | 12/2004 | Naraki et al. |
| 2004/0249764 A1 | 12/2004 | Delitz et al. |
| 2005/0004864 A1 | 1/2005 | Lent et al. |
| 2005/0006286 A1 | 1/2005 | Fery et al. |
| 2005/0021363 A1 | 1/2005 | Stimson et al. |
| 2005/0060254 A1 | 3/2005 | Jones |
| 2005/0086155 A1 | 4/2005 | Villacorta et al. |
| 2005/0086166 A1 | 4/2005 | Monk et al. |
| 2005/0096950 A1 | 5/2005 | Caplan et al. |
| 2005/0097033 A1 | 5/2005 | Pretell et al. |
| 2005/0097036 A1 | 5/2005 | White et al. |
| 2005/0108102 A1 | 5/2005 | York |
| 2005/0108151 A1 | 5/2005 | York |
| 2005/0125295 A1 | 6/2005 | Tidwell et al. |
| 2005/0125296 A1 | 6/2005 | Tidwell et al. |
| 2005/0125315 A1 | 6/2005 | Munoz et al. |
| 2005/0125337 A1 | 6/2005 | Tidwell et al. |
| 2005/0125338 A1 | 6/2005 | Tidwell et al. |
| 2005/0125339 A1 | 6/2005 | Tidwell et al. |
| 2005/0125350 A1 | 6/2005 | Tidwell et al. |
| 2005/0125351 A1 | 6/2005 | Tidwell et al. |
| 2005/0125360 A1 | 6/2005 | Tidwell et al. |
| 2005/0137982 A1 | 6/2005 | Michelassi et al. |
| 2005/0144143 A1 | 6/2005 | Freiberg |
| 2005/0149440 A1 | 7/2005 | Michelassi et al. |
| 2005/0154664 A1 | 7/2005 | Guy et al. |
| 2005/0159986 A1 | 7/2005 | Breeland et al. |
| 2005/0160051 A1 | 7/2005 | Johnson |
| 2005/0167342 A1 | 8/2005 | Vullriede et al. |
| 2005/0171901 A1 | 8/2005 | Rosenblatt et al. |
| 2005/0177523 A1 | 8/2005 | Weiss et al. |
| 2005/0182654 A1 | 8/2005 | Abolfathi et al. |
| 2005/0182735 A1 | 8/2005 | Zager et al. |
| 2005/0199708 A1 | 9/2005 | Friedman |
| 2005/0203857 A1 | 9/2005 | Friedman |
| 2005/0234789 A1 | 10/2005 | Czyzewski et al. |
| 2005/0246627 A1 | 11/2005 | Sayed |
| 2005/0256802 A1 | 11/2005 | Ammermann et al. |
| 2005/0261916 A1 | 11/2005 | McCall et al. |
| 2005/0261995 A1 | 11/2005 | Phelan |
| 2005/0273425 A1 | 12/2005 | Yamazaki |
| 2005/0283429 A1 | 12/2005 | Bates et al. |
| 2005/0288573 A1 | 12/2005 | McCarthy et al. |
| 2006/0004748 A1* | 1/2006 | Ramarathnam et al. ......... 707/6 |
| 2006/0015463 A1 | 1/2006 | Gupta et al. |
| 2006/0031718 A1 | 2/2006 | Thornhill et al. |
| 2006/0036553 A1 | 2/2006 | Gupta et al. |
| 2006/0064329 A1 | 3/2006 | Abolfathi et al. |
| 2006/0080230 A1 | 4/2006 | Freiberg |
| 2006/0080243 A1 | 4/2006 | Kemper et al. |
| 2006/0080254 A1 | 4/2006 | Chigira et al. |
| 2006/0095350 A1 | 5/2006 | Hall et al. |
| 2006/0143077 A1 | 6/2006 | Prorock |
| 2006/0143117 A1 | 6/2006 | Chigira et al. |
| 2006/0149671 A1 | 7/2006 | Nix et al. |
| 2007/0288358 A1 | 12/2007 | Ireland et al. |
| 2008/0040163 A1 | 2/2008 | Harlin et al. |
| 2008/0065530 A1* | 3/2008 | Talbert ............... G06Q 30/02 705/38 |
| 2008/0255986 A1 | 10/2008 | Scarborough et al. |
| 2009/0132312 A1 | 5/2009 | Reinheimer et al. |
| 2009/0216623 A1* | 8/2009 | Hendricks et al. ............... 705/10 |

(56) References Cited

U.S. PATENT DOCUMENTS

2010/0114779 A1    5/2010  Noles
2013/0211972 A1*  8/2013  Hendricks et al. .......... 705/27.1

OTHER PUBLICATIONS

CFO Alert, New Medium brewing for syndications, Mar. 23, 1998, vol. 5, No. 121, ISSN 0894-4822.
Corporate EFT Report, Internet promises lower cost loan syndications IntraLink Replaces paper with online access, Nov. 12, 1997, vol. 17, Issue 21, Phillips Business Information.
E-Aid Office 2000 Fiancial Aid Software Selection, Implementation, and Operation, Copyright 2000 by the National Association of Student Financial Aid Administrators, Jun. 2000, No. 12, pp. 1-29.
Tebbe, Mark, If Bankers can use the Internet to Make Big Bucks, why can't you?, (Between the lines), Sep. 29, 1997, InfoWorld, vol. 19, No. 39, p. 152.
Hickman et al., An Evolutionary Leap in Credit Protfolio Risk Modeling, Dec. 18, 2002.
Automated Capture for Forms & Documents, Cardiff Teleform Elite, copyright 1991-2000.
Car Loans in Minutes, Bank Management, vol. 64, No. 4, Apr. 1, 1993.
Credit Line Optimization, A Marketswitch Paper, Marketswitch Corporation, www.marketswitch.com, copyright 2002, 6 pages.
Credit Score Accuracy and Implications for Consumers, Consumer Federation of America National Credit Rep, Dec. 17, 2002.
Fast Start Scoring Models, Scorex, http://www.scores.com/us/home.html. copyright 2003, Jun. 25, 2005.
Banasiak, Integrating Predictive Scoring Technology, 12th Annual Credit Card Collections Conference, Oct. 15, 2003-Oct. 17, 2003.
NAESB-SUIS Creditworthiness Principles Draft #1, NAESB-SUIS, Dec. 9, 2002.
Hubbard et al., NextGen FICO Scores: More Predictive Power in Account Management, A Fair Isaac Paper, Sep. 1, 2001.
Raines Calls for Open System with Lender Access with Multiple Automated Underwriting Systems; Pledges 1.0 Waive DU Fees on Market Expansion Products: Announces Partnership with MBA on Technology, Lender Profitability Issues, Business Editors, Business Wire.
Scorex Launches New Credit Line Optimization Consulting Service, Scorex, Press Release, Oct. 27, 2003.
Strategy Science Executive Brief, Fair Isaac, copyright Jun. 2003, Jun. 1, 2003.
Rusnak, Raymond, Subprime Auto Finance, What's the Fuss?, What's the Future, A Credit Perspective, The Journal of Lending & Credit Risk Management, pp.1 23-30, Apr. 1997.
Triad Adaptive Control System-Version 7, Fair Isaac, copyright 2003, Jun. 25, 2005.
Paradi et al., Using DEA and Negative DEA in Credit Risk Evaluation, Journal of Productivity Analysis, vol. 21, 2004, pp. 153-165.
Bouchaud, Jean-Philippe et al.; "Theory of Financial Risk and Derivative Pricing;" pp. 56-57; Copyright: 2000.
Piramuthu, Selwyn; "Financial credit-risk evaluation with neural and neurofuzzy systems," European Journal of Operational Research, vol. 112, Issue 2, pp. 310-321; Jan. 16, 1199.

* cited by examiner

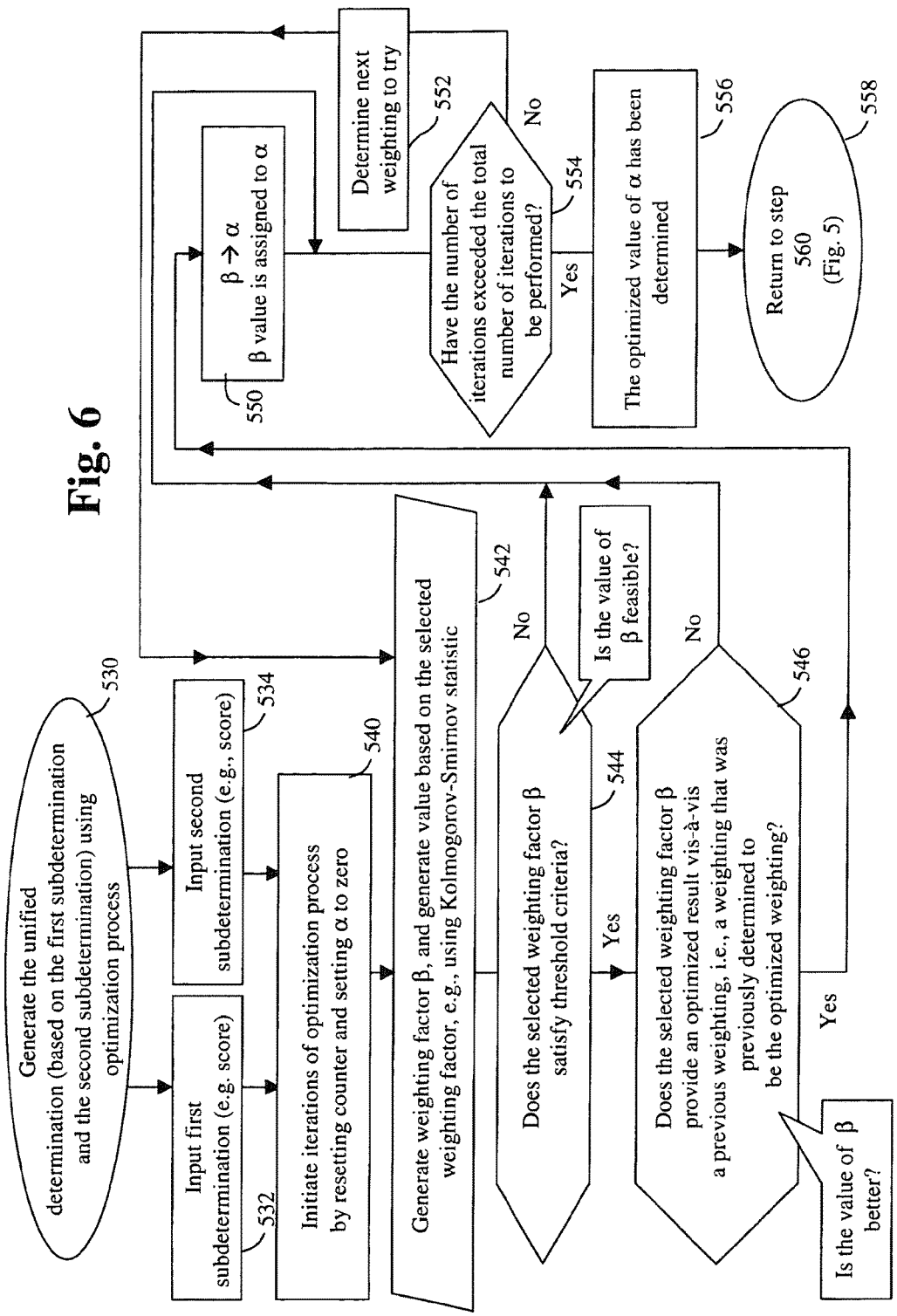

SYSTEMS AND METHODS FOR PERFORMING SCORING OPTIMIZATION

RELATED APPLICATIONS

This patent application is a Continuation of U.S. patent application Ser. No. 13/585,218 filed on Aug. 14, 2012 entitled "SYSTEMS AND METHODS FOR PERFORMING SCORING OPTIMIZATION" to which priority is claimed.

U.S. patent application Ser. No. 13/585,218 is a Continuation of U.S. patent application Ser. No. 13/085,193 filed on Apr. 12, 2011 entitled "SYSTEMS AND METHODS FOR PERFORMING SCORING OPTIMIZATION," to which priority is claimed, and which is now U.S. Pat. No. 8,255,319, which is a Continuation of U.S. patent application Ser. No. 11/211,728, filed on Aug. 26, 2005 entitled "SYSTEMS AND METHODS FOR PERFORMING SCORING OPTIMIZATION," to which priority is claimed, and which is now U.S. Pat. No. 7,925,578, and which is hereby incorporated herein by reference in its entirety.

All the above patent applications are hereby incorporated herein by reference in their entirety.

BACKGROUND OF THE INVENTION

There are a wide variety of situations where determinations are made at different points through the course of a process and/or where determinations are made based on different data. Such determinations may vary by the particular type of data that is used in the determination. Alternatively, such determinations may involve data that is secured at a different time, i.e., updated data may be used (instead of older data that was used in a prior determination). A determination might be expressed in terms of a score, i.e., some other quantitative representation.

As can be appreciated, such different determinations made over a period of time or made based on different data may vary in the result such determinations yield. For example, a credit card issuer may be conducting a campaign to secure new credit card customers. The campaign might typically involve determining individuals that should be mailed credit card offers. In determining such individuals, the credit card issuer generates a credit risk score for each individual. The credit risk score may be based on data secured from a credit bureau or other data that is assessable by the credit card issuer. At this point in the process, the credit risk score might be characterized as a "front end" risk score. In other words, at actual mailing selection time, the credit card issuer has to select names for offers from the whole credit eligible universe.

Individuals who receive the offer (through mailings, e-mailings, or any other suitable medium) have the opportunity to review and accept the offer. Accordingly, at some later time, the credit card issuer will receive responses from some of those individuals.

Once a response is received from an individual (a respondent), the credit card issuer then determines whether the credit card issuer will indeed issue a credit card to the respondent. In other words, at credit approval/decline time, the business has to make the booking decision among all of respondent applicants. This decision involves determination of a further risk score, i.e., a "back-end" risk. The back-end risk score will thus be determined at a later time, than the front end risk-score, and might also involve different parameters. As a result, it is very likely the back-end risk score is different from the one based on the random sample of the whole eligible credit universe, i.e., different from the front end risk score.

In such situation, the credit card issuer, as between the front-end risk score and the back-end risk score, has two different universes and two different goals. Using known techniques, it is very difficult to provide satisfactory results for one goal while it is developed against another goal. Historically business uses two different scores, one for the front end determination and one for the back end determination. However, that approach sometimes causes problems since the credit card issuer or other business makes the selection decision to mail an offer based on one score, and later the business decides to decline a responder of the offer based on second score. Such action is unfortunately sometimes necessary, from a business perspective, but is not beneficial to the business from a public relations perspective.

The above and other problems are present in known processes.

BRIEF SUMMARY OF THE INVENTION

The invention provides systems and methods relating to generating a unified determination based on subdeterminations, and in particular, generating a unified score based on respective scores. For example, the invention provides a method for generating a unified determination based on subdeterminations, the method including generating a first subdetermination based on first criteria; generating a second subdetermination based on second criteria; and generating a unified determination based on the first subdetermination and the second subdetermination. The generation of the unified determination includes (a) assigning, using iterative processing, an assigned weighting respectively to the first determination and second determination; (b) determining if the assigned weighting satisfies at least one constraint; (c) comparing the assigned weighting to an optimized weighting, which was previously determined, to determine if the assigned weighting is improved over the optimized weighting; and (d) if the assigned weighting is improved, then assigning the assigned weighting to be the optimized weighting.

BRIEF DESCRIPTION OF THE DRAWINGS

The present invention can be more fully understood by reading the following detailed description together with the accompanying drawings, in which like reference indicators are used to designate like elements, and in which:

FIG. 6 is a flow chart showing further details of the "generate the unified determination (based on the first subdetermination and the second subdetermination) using an optimization process" step of FIG. 5 in accordance with one embodiment of the invention.

DETAILED DESCRIPTION OF THE INVENTION

Figure 1:
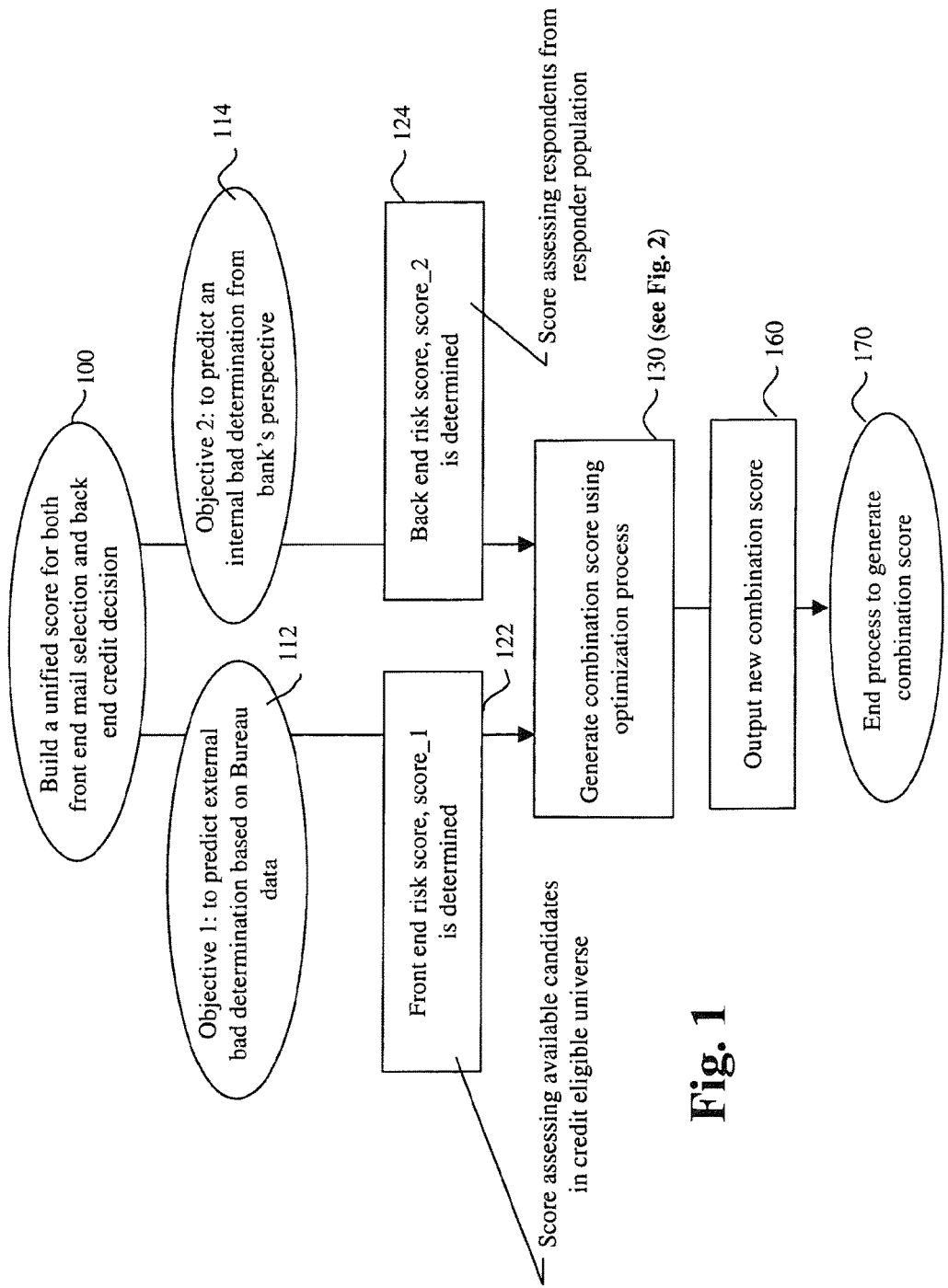
FIG. 1 is a flowchart showing a process of building a unified score for both front end mail selection and back end credit decision in accordance with one embodiment of the invention.

Hereinafter, aspects of the systems and methods in accordance with various embodiments of the invention will be described. As used herein, any term in the singular may be interpreted to be in the plural, and alternatively, any term in the plural may be interpreted to be in the singular.

The systems and methods of the invention are directed to the above stated problems, as well as other problems, that are present in conventional techniques.

In introduction, the invention, in one embodiment, provides a system and method to perform risk based scoring. For example, the invention may be applied to the situation where risk scores are needed both in (1) selection of recipients for mailings; and (2) the decision whether to book applicants responding to such mailings, i.e., a risk score is needed that is representative of both the "front end" and "back end" risk assessment criteria.

As further background information in accordance with one embodiment of the invention, historically a business uses two different scores, one for the front end risk assessment and one for the back end risk assessment. That approach causes problems in the situation that (1) a business makes a selection decision to mail an offer based on one score, and later, (2) the business decides to decline a responder of the offer based on second score. The invention provides a single score to overcome this problem.

The invention provides a novel approach that generates a score that may be used for both front end and back end risk assessment. In a method of one embodiment of the invention, a front end initial score and a back end initial score are developed using data obtained from a credit bureau, for example. The two initial scores are developed based on respective criteria relating to the front and back end risk assessments. Then, the two initial scores are combined into a single score. This combining is performed using an optimization process. The goal is that the single score resulting from the combination should satisfy applied constraints and outperform benchmark scores, so as to maximize the total performance measurement.

In accordance with one embodiment of the invention, the optimization process (by which the initial front end score and the initial back end score are combined) may utilize Kolmogorov-Smirnov test (KS-test) processing. The KS-test is typically used to determine the magnitude that two data sets differ. In the invention, the KS-test may be utilized in iterative processing to determine a best parameter to use in combining the two initial scores. In particular, the KS-test may be used to determine a weighting parameter based on respective objectives of the front end initial score and a back end initial score, and predetermined constraints. The predetermined constraints may be based on performance of benchmark scores and business requirements, for example. As noted below, other statistical methodologies may be used in lieu of the KS Test.

The invention as described herein may be applied to the selection of recipients for mailings and the booking of the respondents to such mailings. Accordingly, the system and method of the invention may provide a key tool in acquisition mailing campaigns. In addition, the invention may be utilized in a wide variety of other situations to develop models—to achieve satisfactory results for multiple goals at the same time.

Hereinafter, further aspects of the systems and methods of embodiments will be described in further detail.

Accordingly, in one embodiment, the invention addresses the need to develop credit risk score for new account acquisition campaigns, and in particular in the situation where a business requires a single score for both front end processing (in selection of persons to send offers) and back end processing (in the credit approval or decline processing).

In this situation, at actual mailing selection time, a business has to select names, to which offers will be sent, from the whole credit eligible universe. At this stage of the process, a business may use the criteria of whether a prospect will go bad on any trade with a financial institution as objective function for the risk score, i.e., the front-end risk score is predicting the possibility of whether the particular individual will have at least one bad trade with any financial institution in next several months, i.e., such as 12 months, for example.

However, at credit approval or decline time, the particular business has to make the booking decision among all of responder applicants. This responder population has to become the development population for the back-end risk score and very likely it is very different from one based on the random sample of whole eligible credit universe. Furthermore for this back-end risk score, what the known processing predicts, for example, is whether or not an approved account with the offering institution will be defaulted in the future, i.e., if the institution indeed decides to approve and book the account.

Accordingly, it should be appreciated that the business, i.e., the offering institution, clearly has two different universes and two different objective functions. Using known techniques, it is very difficult to provide satisfactory results for one goal while it is developed against another goal, as is noted above. In particular, there is no easy statistical methodology to achieve both goals at same time. As should be appreciated, if the back end score provides different indicators, e.g. such as the credit worthiness of the individual, as compared to the front end score, the back end score may indicate to not extend the credit card offer. Such is problematic in disappointing the individual, who had been offered the card, and thus bad from a public relations perspective.

In order to solve the above conflict between two scores, the invention provides a unified score to represent both the traditional front end score and the traditional back end. The invention provides the unified score in what is believed to be a very novel approach. In a first step, each score is generated based on its own population and objective function. In accordance with one embodiment of the invention, each score is generated with the same set of bureau variables and bureau data.

In a second phase of the process, an optimization process is used to combine the two scores into a final product, i.e., a unified score. One goal is that the final score should outperform the individual benchmark scores on its own population, but at the same time maximize the total performance measurement.

In accordance with one embodiment of the invention, FIG. 1 is a flowchart showing a process of building a unified score for both front end mail selection and back end credit decision. As shown, the process starts in step 100 and passes to steps 112 and 114. That is, steps 112 and 114 are performed in parallel.

In step 112, a first objective is identified. In this example, the first objective is to predict whether the particular individual is a bad risk based on credit bureau data, i.e., so as to determine whether the particular individual is a good candidate to forward an offer. The first objective might be thought of as determining the merits of the individual and their credit risk vis-à-vis the individuals existing creditors. Accordingly, from step 112, the process passes to step 122. In step 122, the front end risk score, score_1 is determined. In other words, score_1 assesses available candidates in the credit eligible universe to determine which candidates should be mailed, or otherwise forwarded offers. After step 122, the process passes to step 130.

In parallel to steps 112 and 122, in this embodiment, the process of FIG. 1 includes step 114. In step 114, an objective is determined to predict an internal bad determination, i.e., from the perspective of the bank considering issuance of the credit offer to the individual. Accordingly, in step 124, what is herein characterized as the back end risk score (score_2) is determined. Score_2 is a score assessing respondents from the responder population, i.e., so as to determine whether the bank will extend a credit line to a responder.

Accordingly, as shown in FIG. 1, score_1 is the score built to predict objective one and score_2 is the score built to predict objective two. In this embodiment, we can find the best parameter to combine the two scores by solving an optimization problem.

That is, after performing the steps 122 and 124, the process of FIG. 1 passes to step 130. In step 130, a combination score is generated using an optimization process as described below. The optimization process results in a new combination score, which is output in step 160.

After step 160, the process of FIG. 1 passes to step 170. In step 170, the process ends.

Figure 2:
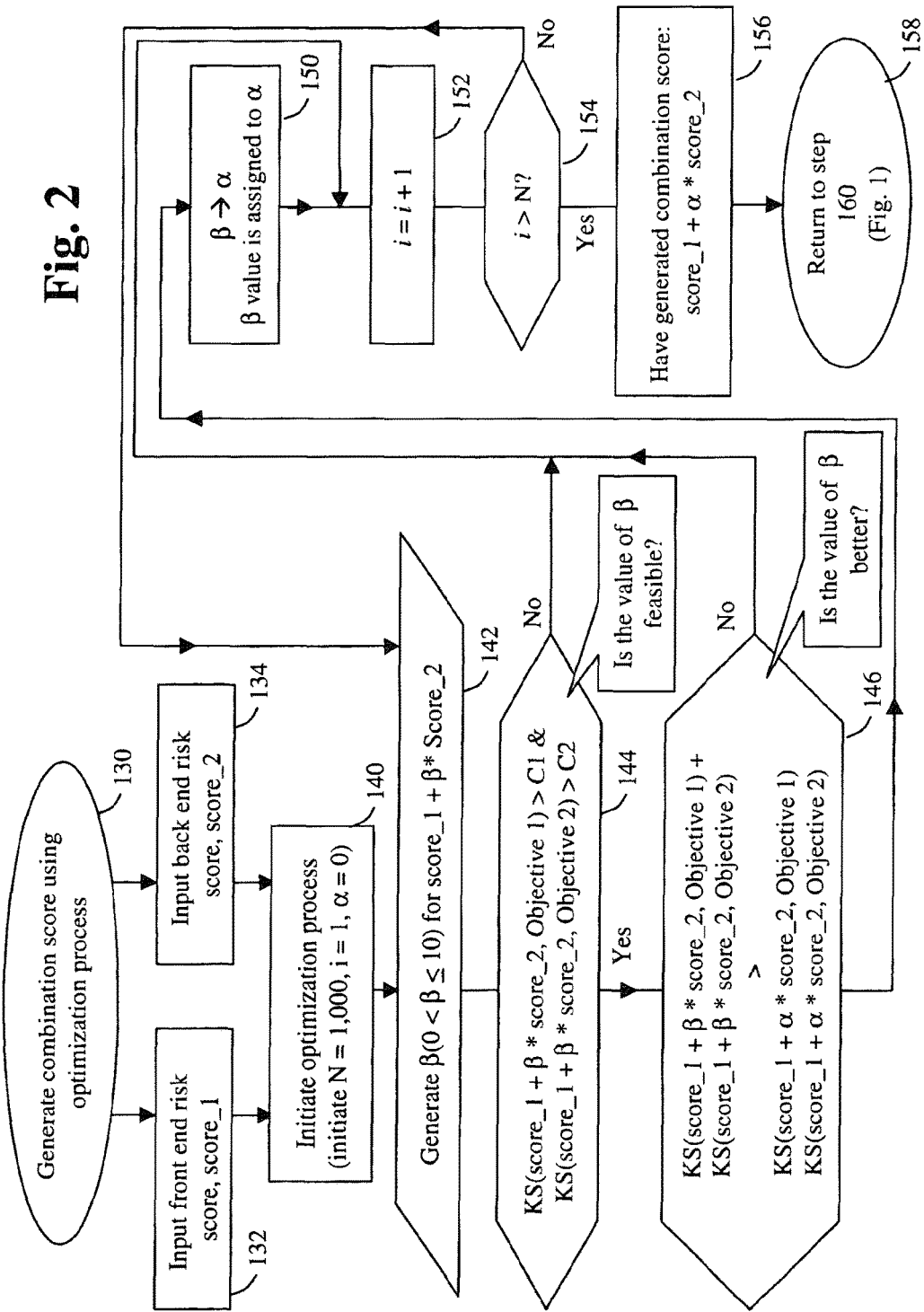
FIG. 2 is a flow chart showing further details of the "generate combination score using optimization process" step of FIG. 1 in accordance with one embodiment of the invention.

FIG. 2 is a flow chart showing further details of the "generate combination score using optimization process step" of FIG. 1 in accordance with one embodiment of the invention. As shown in FIG. 2, the process starts in step 130, and passes to step both of steps 132 and 134.

In step 132, the subprocess of FIG. 2 inputs the front end risk score, score_2. In parallel with step 132, in step 134, the process inputs the back end risk score, score_2. After each of steps 132 and 134, as shown in FIG. 2, the process passes to step 140.

In step 140, the optimization process is initiated. That is, in this embodiment, the value of N is assigned 1,000, a counter "i" is assigned a value of 1, and $\alpha$ is assigned a value of zero. In other words, initial values are assigned to variables in order to initiate the iterative optimization process. The values of "i" and "N" control the progression through and the termination of the iterative process. After step 140, the process passes to step 142.

As shown in FIG. 2, the variables are as follows:

$\beta$ is a weighting factor or value that is generated for consideration in the optimization process. $\beta$ might be generated by a random number generator in some controlled manner;

$\alpha$ is a weighting factor or value that represents the best weighting factor achieved at a particular point in the progression of the optimization process. $\alpha$ might be initiated at zero (0), for example;

"i" is the progressing integer value, i.e., a counter, that controls the progression of generating the $\beta$ values. For example, "i" might be 1, 2, 3, 4 . . . 1000;

N is the value to which "i" will progress, e.g., 1000;

C1 is a benchmark score to determine if, in terms of Objective 1, $\beta$ is a feasible value;

C2 is a benchmark score to determine if, in terms of Objective 2, $\beta$ is a feasible value; and KS is a Kolmogorov-Smirnov statistic.

Hereinafter, further general aspects of the systems and methods of embodiments will be described in further detail. In this embodiment as described above, first, the process develops each score based on its own population and objective function, using the same set of bureau variables, or other suitable variables. Then, an optimization process is used to combine these two scores into a final product, i.e., a unified score. The goal is the final score should outperform existing individual score on its own population at same time and maximizes the total performance measurement. In this embodiment, it is assumed that score_1 is the score built to predict objective one and score_2 is the score built to predict objective two. In this embodiment, the invention finds the best parameter to combine the two scores by solving the following optimization problem:

Maximize(KS(SCR_1+$\alpha$*SCR_2, objective one)+KS (SCR_1+$\alpha$*SCR_2, objective two))

Subject to:

KS(SCR_1+$\alpha$*SCR_2, objective one)>C1; AND
KS(SCR_1+$\alpha$*SCR_2, objective two)>C2

Here the benchmark scores C1 and C2 are predetermined by the performances of benchmark scores and business requirements, or other parameters as may be desired. As a further step, adverse action reason codes may be generated from the same pool of model attributes by using appropriate weights. That is, an adverse action reason code may be needed to provide a reason why a responder (who was initially extended an offer) was declined, i.e., subsequent to responding to the offer. Accordingly, the optimization process (in conjunction with generating the unified value) may also be manipulated so as to provide some intelligence regarding why a respondent might be declined (i.e., adverse action reason codes).

With the approaches described above, the invention achieves the goal of obtaining a unified score by taking advantages out of both scores. In general, it is appreciated that the idea of the invention may be used to develop models to achieve satisfactory result for multiple goals at the same time. The invention might be used in a variety of business and/or for other objectives.

Returning now to FIG. 2, after step 140 in which the optimization process is initiated, the process passes to step 142. In step 142, a $\beta$ value is generated. The $\beta$ value is generated in some suitable manner, i.e., such as using a random number generator. Various known techniques might be used such as a Monte Carlo approach and/or stratification of the $\beta$ values. Accordingly, in some suitable manner, $\beta$ is generated in step 142. As shown, $\beta$ may be constrained to be between 1 and 10.

As shown in step 142, $\beta$ is generated so as to be used in the KS statistic, and specifically in the parameter:

score_1+$\beta$*score_2.

After step 142, the process passes to step 144. Step 144 might be characterized as a determination of whether the current value of $\beta$ is feasible. Such feasibility is determined vis-à-vis benchmark scores C1 and C2. That is, in step 142, the process determines if the KS statistic based on $\beta$ is satisfied vis-à-vis C1 and C2, i.e., the process determines if:

KS(score_1+$\beta$*score_2, Objective 1)>C1 AND
KS(score_1+$\beta$*score_2, Objective 2)>C2

If such two relationships are not satisfied, such is indicative that the current value of $\beta$ (i.e., the current weighting of the first and second scores) is simply not feasible. Accordingly, the process of FIG. 2 passes from step 144 to step 152. In step 152, the value of "i" is incremented by "1", i.e., to count of one iteration. Then the process passes to step 154 to determine if another iteration should be performed, i.e., if the value of N has been attained by "i". If the value of N has not been attained, the process passes back to step 142 for another iteration.

Accordingly, in step 142 another β value is generated, e.g., using a random number generator. The process will then again proceed to step 144 to determine if the new value of β is feasible, i.e., to determine if the new value of β satisfies the criteria of step 144. Processing will then proceed as discussed above.

In step 144, if a particular value of β satisfies the benchmark criteria, the process passes to step 146. Step 146 might be characterized as presenting a challenger β that is compared with the existing champion α. That is, the total KS statistic of (score_1+β*score_2, Objective 1) plus the KS statistic of (score_1+β*score_2, Objective 2) is determined. This KS statistic is compared with the KS statistic of (score_1+α* score_2, Objective 1) plus the KS statistic of (score_1+α*score_2, Objective 2). In other words, the KS statistic based on β is compared with the KS statistic based on α.

In step 146, if the KS statistic based on β is "less" than the KS statistic based on α, i.e., the relationship of step 146 is not satisfied, than the existing a remains the best weighting parameter. Accordingly, the process of FIG. 2 passes to step 152, wherein the value of "i" is incremented, and processing proceeds as discussed above.

In this comparison of step 146, the process determines if the KS statistic based on β is "less" than the KS statistic based on α. However, in short, any comparison or other process may be used to determine if β is an optimized result over the existing α.

Returning to the processing of step 146, the relationship of step 146 may be satisfied, i.e., β is better than the existing α. As a result, the process passes to step 150. In step 150, the value of β is assigned to α, which might be characterized as β becoming the new champion.

After step 150, the process passes to step 152. In step 152, the value of "i" is incremented by 1. After step 152, the process passes to step 154.

As described above, in step 154, the process determines whether another iterative loop should be effected, or whether the optimization process is completed. That is, in step 154 in this embodiment, the process determines whether the value of "i" is greater than "N". If yes, then all the iterative loops have been performed, and the optimization process is complete. Accordingly, the process passes to step 156 and the current α value constitutes the combination score. That is, the combination score may be expressed as: "score_1+α*score_2".

After step 156, the process passes to step 158. In step 158, the process returns to step 160 of FIG. 1.

In summary of the processing of FIG. 1 and FIG. 2, a marketing campaign may be based on Objective 1 (for example, indicator of bureau bad at month 12) and Objective 2 (for example, indicator of internal bad at month 12). As illustrated in FIG. 2, first, we build a score (score_1) to predict objective 1 on the whole campaign file and a score (score_2) to predict objective 2 on the approvals, i.e., the approvals being respondents who will be approved for a credit line.

As set forth above, the targeted KS (Kolmogorov-Smirnov) Statistics in predicting objective 1 and objective 2 are C1 and C2, respectively. The performances of existing benchmark scores and the cost of the development and implementation of a new score may be used to predetermine C1 and C2. Through the optimization process, the final score has the form of (score_1+α*score_2), where α is weighting parameter.

In the example of FIG. 2, a step-wise maximization method is used to find the optimal value of α. That is, the value of "i" is stepped up as the optimization process is progressed. However, it should of course be appreciated that other approaches may be used instead of a step approach. That is, any suitable methodology may be used to progress through the iterative processing and/or to choose the trail weighting values. For example, iterations might continue until some desired criteria is satisfied, e.g., criteria vis-à-vis the benchmark scores, for example.

Figure 3:
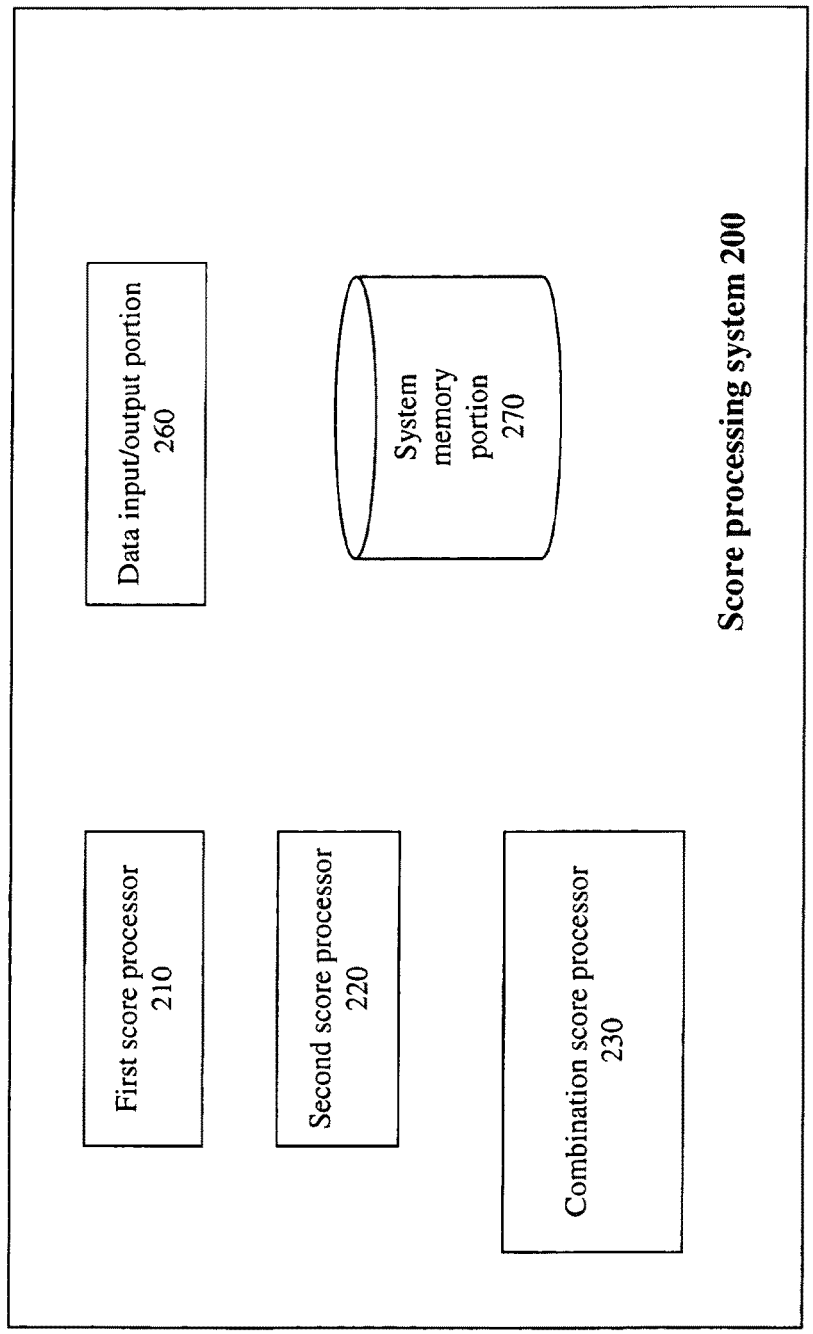
FIG. 3 is a block diagram showing a score processing system in accordance with one embodiment of the invention.

Accordingly, FIGS. 1 and 2 set forth a process in accordance with one embodiment of the invention. It should be appreciated that a suitable processing system is used to implement the processing of FIGS. 1 and 2. FIG. 3 is a block diagram showing a score processing system in accordance with one embodiment of the invention.

As shown in FIG. 3, the score processing system 200 includes a first score processor 210 and a second score processor 220. The first score processor 210 generates a first score as illustratively shown in step 122 of FIG. 1. The second score processor 220 generates a second score as illustratively shown in step 124 of FIG. 1. As described above, the first score and the second score are respectively related to desired objectives.

The score processing system 200 further includes a combination score processor 230. The combination score processor 230 may be used to perform the processing of step 130 of FIG. 1, i.e., the processing of FIG. 2. The score processing system 200 further includes a data input/output portion 260. The data input/output portion 260 is utilized to input the various data used by the score processing system 200, as well as to output data generated by the score processing system 200. For example, the data input/output portion 260 may include a user interface that allows a human user to interface with the score processing system 200.

The score processing system 200 as shown in FIG. 3 further includes a system memory portion 270. The system memory portion 270 is a general purpose memory to store any of a wide variety of data input into or generated by the score processing system 200.

Figure 4:
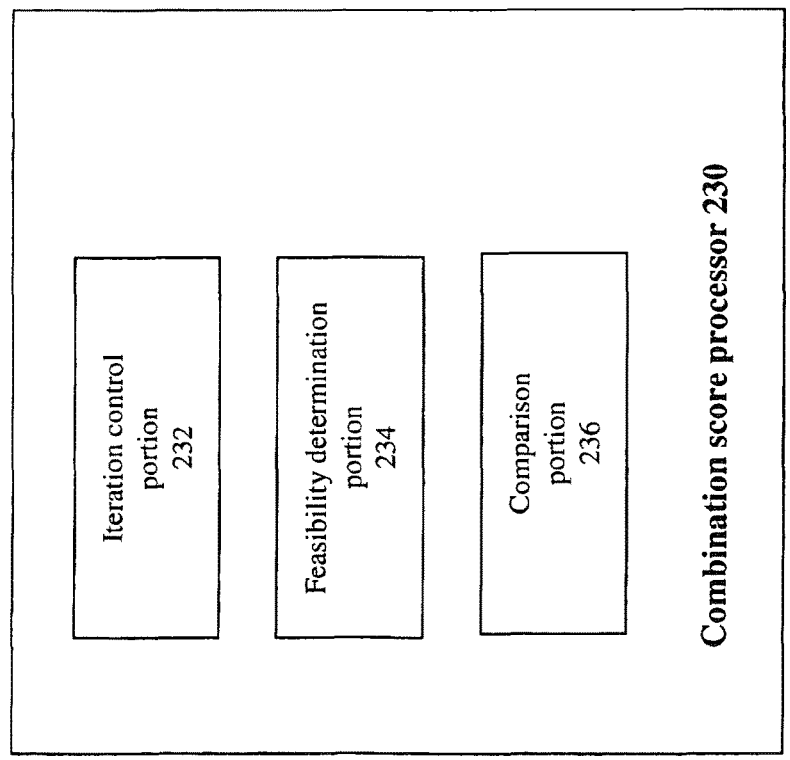
FIG. 4 is a block diagram showing the combination score processor of FIG. 3 in further detail in accordance with one embodiment of the invention.

FIG. 4 is a block diagram showing further details of the combination score processor 230 in accordance with one embodiment of the invention. The combination score processor 230 includes an iteration control portion 232, a feasibility determination portion 234 and a comparison portion 236.

With illustrative reference to FIG. 2, the feasibility determination portion 234 performs the processing of step 144. That is, in accordance with one embodiment, the feasibility determination portion 234 determines if the particular weighting (e.g., the value of β) of the front end risk score and the back end risk score is feasible.

If the weighting (β) is feasible, the process is then handed to the comparison portion 236. The comparison portion 236 performs the processing of step 146, in the embodiment of FIG. 2. That is, the comparison portion 236 determines if the value of the weighting factor β (the challenger) provides a better result than α (the current champion).

The combination score processor 230 also includes the iteration control portion 232. The iteration control portion 232 controls the iterative processing of FIG. 2. That is, for example, the iteration control portion 232 performs steps 140, 150, 152 and 154 that relate to the iterative processing.

Figure 5:
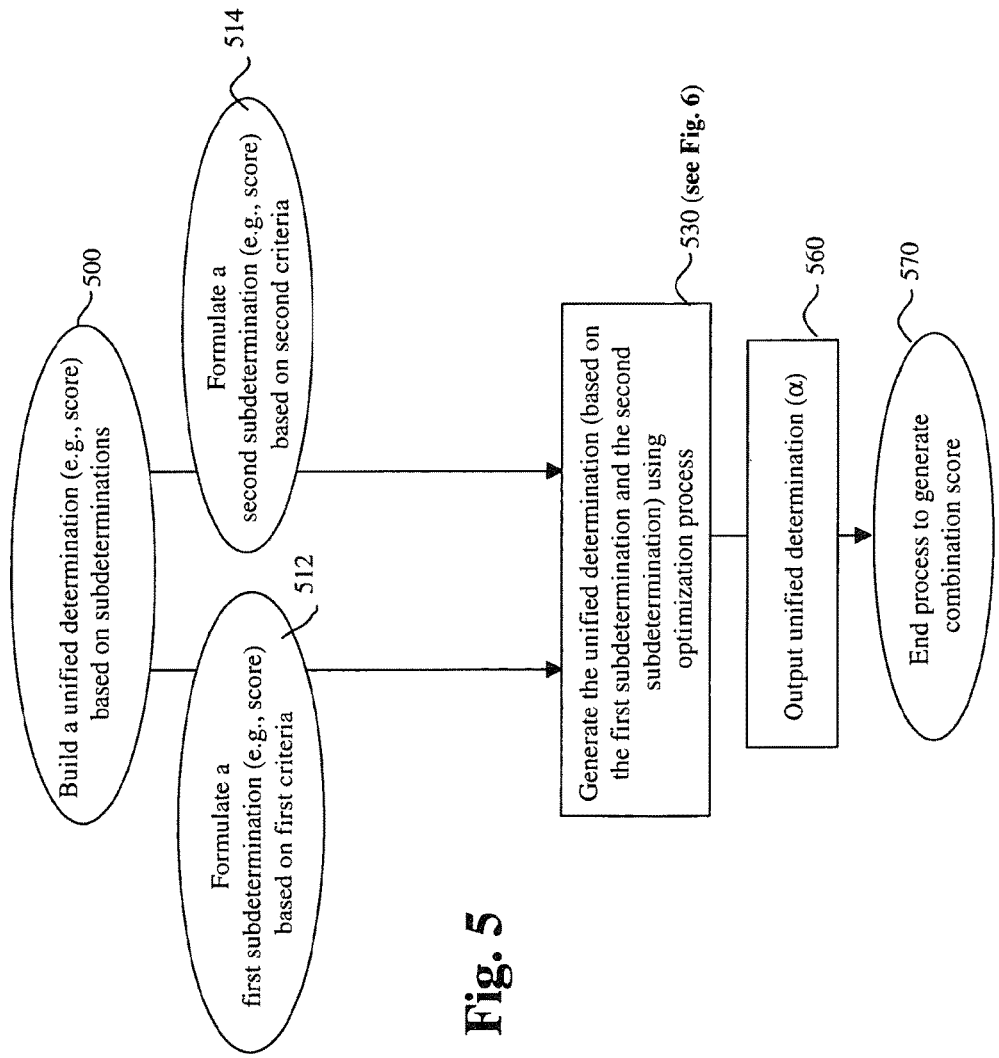
FIG. 5 is a flowchart showing a process of building a unified determination based on subdeterminations in accordance with one embodiment of the invention.

In further explanation of aspects of the invention, FIG. 5 is a flowchart showing a process of building a unified determination based on subdeterminations in accordance with one embodiment of the invention. In summary, FIG. 5 is a generalized optimization process vis-à-vis the processing of FIGS. 1 and 2. As shown, the process of FIG. 5 starts in step 500 and passes to step 512 and step 514, which may be performed in parallel.

In step 512, the process formulates a first subdetermination (e.g., score) based on first criteria. In step 514, the process formulates a second subdetermination (e.g., score) based on second criteria. After the processing of steps 512 and 514 are performed, the process passes to step 530.

In step 530, the process generates a unified determination (based on the first subdetermination and the second subdetermination) using an optimization process. Further details of the processing of step 530 are discussed below.

Then, in step 560, the process outputs a unified determination, e.g., a weighting value of ($\alpha$). After step 560, the process passes to step 570, at which point the process ends.

FIG. 6 is a flow chart showing further details of the "generate the unified determination (based on the first subdetermination and the second subdetermination) using an optimization process" step 530 of FIG. 5 in accordance with one embodiment of the invention.

After the subprocess starts in step 530 of FIG. 6, the process passes to steps 532 and 534, i.e., steps 532 and 534 are performed in parallel. In step 532, the process inputs the first subdetermination (e.g. score), which was generated in the processing of FIG. 5. In step 534, the process inputs the second subdetermination (e.g., score), which was also generated in the processing of FIG. 5.

After steps 532 and 534, the process passes to step 540. In step 540, the process initiates iterations of the optimization process by restarting a counter (i.e., that controls progression through the iteration process) and resets the a value to zero. After step 540, the process passes to step 542.

In step 542, the process generates a weighting factor $\beta$, and generates a value based on the selected weighting factor, i.e., generates a result from using $\beta$. For example, this might be performed using Kolmogorov-Smirnov statistic processing. Then, the process passes to step 544. In step 544, the process determines whether the selected weighting factor $\beta$ satisfies the threshold criteria? If no, then the particular $\beta$ value is not feasible, and the process passes to step 554.

On the other hand, if the value of $\beta$ in step 544 does indeed satisfy the threshold criteria, then the process passes to step 546. In step 546, the process determines whether the selected weighting factor $\beta$ provides an optimized result vis-à-vis a previous weighting, i.e., $\alpha$ (the weighting that was previously determined to be the optimized weighting, if any). If $\beta$ is not a better result than the prior best result $\alpha$, then the process passes to step 554.

Alternatively, if the value of $\beta$ does provide a better result than the previously determined $\alpha$, then the process passes to step 550. In step 550, the $\beta$ value is assigned to $\alpha$. Then, the process passes to step 554.

In step 554, the process determines if the number of iterations that have been performed exceed the total number of desired iterations to be performed? For example, this may be accomplished using a suitable counter, which is incremented by 1 until a threshold value is attained. If the process determines in step 554 that further iterations should be performed, then the process passes to step 552. In step 552, the process determines the next weighting to try, e.g., using a random number generator. The process then returns to step 542, and processing continues, as described above.

Alternatively, it may be the case that all the iterations have been performed. Accordingly, the current value of $\alpha$ is the optimized weighting, as reflected in step 556. After step 556, the process passes to step 558. In step 558, the process returns to step 560 of FIG. 5.

The systems and methods of embodiments have been described above as relating to a front end risk score and a backend risk score, i.e., a score used in deciding who to mail offers to and a score in later deciding whether to indeed extend a line of credit to a responder. However, the invention is not limited to such application, Rather, the invention extends to any situation in which respective scores, or other determinations, are made under different circumstances, and it is desired that a unified score be developed that best represents the two respective scores. In particular, the invention might be used in situations where there is (a) a decision process as to whether an offer will be extended; and later (b) a second decision process as to action taken with regard to such offer. Such processing is of course widely applicable to the financial arena.

Further, the systems and methods of embodiments are not in any way limited to credit cards. Rather, the invention might be used in conjunction with a variety of financial mechanisms, in contractual situations, or in any other situation where a unified relationship is desired between two relationships.

Embodiments have been described above as relating to individuals, e.g., a credit card offer being extended to an individual. However, the invention is certainly not limited to such application. The invention might be applied to a business, group of individuals or any other entity.

Further, as noted above, embodiments of the invention do not need to utilize the KS (Kolmogorov-Smirnov) test. Rather, other statistical approaches might be utilized to determine the variance between a particular trial weighting $\beta$ vis-à-vis the first score and the second score, i.e., as determined in steps 512 and 514 of FIG. 5, for example. For example, alternative measures might be (1) GINI Coefficient or (2) Information Values (IV). In summary, the KS Test is a measure of maximum distance between cumulative distributions of two populations. The KS Test was originally developed by Kolmogorov & Smirnove. The Gini Coefficient (Efficiency Index) test measures area between two cumulative distributions of two populations. It was originally developed by Corrado Gini. On the other hand, the Information Value (Kullback-Leibler Distance) test measures the distance between distributions of two populations. This test was originally developed by Kullback & Leibler. These tests, as well as other statistical approaches might be utilized in the processing of the invention.

Hereinafter, general aspects of implementation of embodiments will be described. As described above, FIGS. 3 and 4 show one embodiment of the system of the invention. Further, FIGS. 1, 2, 5 and 6 show various steps of one embodiment of the method of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold or implement the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for generating a unified determination based on subdeterminations, the system including:
   a first score processor generating a first subdetermination based on first criteria, wherein the first criteria is a front end risk score, and wherein the front end risk score determines if an individual is to be mailed an offer for a financial product;
   a second score processor generating a second subdetermination based on second criteria, wherein the second criteria is a back end risk score, and wherein the back end risk score determines if the individual, who is a respondent to the offer, is to be extended the financial product;
   a combination score processor generating a unified determination based on the first subdetermination and the second subdetermination, the combination score processor including:
      an iteration control portion assigning, using iterative processing, an assigned weighting respectively to the first determination and second determination;
      a comparison portion comparing the assigned weighting to an optimized weighting, which was previously determined, to determine if the assigned weighting is improved over the optimized weighting; and if the assigned weighting is improved, then the comparison portion assigning the assigned weighting to be the optimized weighting;
   wherein the first subdetermination is a first score, and the second subdetermination is a second score;
      wherein the comparison portion comparing the assigned weighting to an optimized weighting to determine if the assigned weighting is improved over the optimized weighting includes:
      using a first relationship including first parameters to generate a first result, the first parameters including the first subdetermination, the second subdetermination, the assigned weighting and a first objective parameter; and
      using a second relationship including second parameters to generate a second result, the second parameters including the first subdetermination, the second subdetermination, the optimized weighting and the first objective parameter, and
      comparing the first result to the second result; and
   the system constituted by a tangibly embodied computer processing machine.

2. The system of claim 1, the system further including a feasibility determination portion, and
   the feasibility determination portion determining if the assigned weighting satisfies at least one constraint.

3. The system of claim 2, wherein the feasibility determination portion determining if the assigned weighting satisfies at least one constraint is performed using a first relationship including parameters, and comparing a result of the first relationship with a first constraint value.

4. The system of claim 3, wherein the determining if the assigned weighting satisfies at least one constraint is performed using a second relationship including parameters, and comparing a result of the second relationship with a second constraint value.

5. The system of claim 4, the parameters of the first relationship including the first subdetermination, the second subdetermination, the assigned weighting and a first objective parameter.

6. The system of claim 5, the parameters of the second relationship including the first subdetermination, the second subdetermination, the assigned weighting and a second objective parameter.

7. The system of claim 3, the parameters of the first relationship including the first subdetermination, the second subdetermination, the assigned weighting and a first objective parameter.

8. The system of claim 1, wherein the financial product is a credit card.

9. The system of claim 1, further including the system:
inputting information from a credit bureau entity; and
generating the first score and the second score based on the information input from the credit bureau entity.

10. The system of claim 9, including the system securing information from an applicant for a credit card; and
the system using the information from the Applicant for the credit card to generate the second score.

11. The system of claim 1, wherein the first result and the second result are computed by the system using a Kolmogorov-Smirnov statistic.

12. The system of claim 1, further including the system using a second objective parameter in determining the first result and the second result.

13. The system of claim 1, wherein the iterative processing is effected by the system using a progressing value, the progressing value being advanced after (a) the determining if the assigned weighting satisfies at least one constraint, and (b) comparing the assigned weighting to the optimized weighting.

14. The system of claim 13, wherein the progressing value is advanced until the progressing value attains a threshold value, which marks the final iteration.

15. The system of claim 13, wherein the assigning, using iterative processing, the assigned weighting respectively to the first determination and second determination includes utilizing a random number generator to assign the weighting.

16. A method for generating a unified determination based on subdeterminations, the method performed by a tangibly embodied computer processing machine, the method including:
generating, by the computer processing machine, a first subdetermination based on first criteria, wherein the first criteria is a front end risk score, and wherein the front end risk score determines if an individual is to be mailed an offer for a financial product;
generating, by the computer processing machine, a second subdetermination based on second criteria, wherein the second criteria is a back end risk score, and wherein the back end risk score determines if the individual, who is a respondent to the offer, is to be extended the financial product;
generating, by the computer processing machine, a unified determination based on the first subdetermination and the second subdetermination including:
assigning, by the computer processing machine, using iterative processing, an assigned weighting respectively to the first determination and second determination;
comparing, by the computer processing machine, the assigned weighting to an optimized weighting, which was previously determined, to determine if the assigned weighting is improved over the optimized weighting; and if the assigned weighting is improved, then assigning the assigned weighting to be the optimized weighting;
wherein the first subdetermination is a first score, and the second subdetermination is a second score;
wherein the comparing the assigned weighting to an optimized weighting to determine if the assigned weighting is improved over the optimized weighting includes:
using a first relationship including first parameters to generate a first result, the first parameters including the first subdetermination, the second subdetermination, the assigned weighting and a first objective parameter; and
using a second relationship including second parameters to generate a second result, the second parameters including the first subdetermination, the second subdetermination, the optimized weighting and the first objective parameter, and
comparing the first result to the second result.

* * * * *